March 23, 1954
W. W. TRANTER
2,672,759
OSCILLATING MECHANISM FOR SPRAYERS
Filed Aug. 24, 1948
4 Sheets-Sheet 1
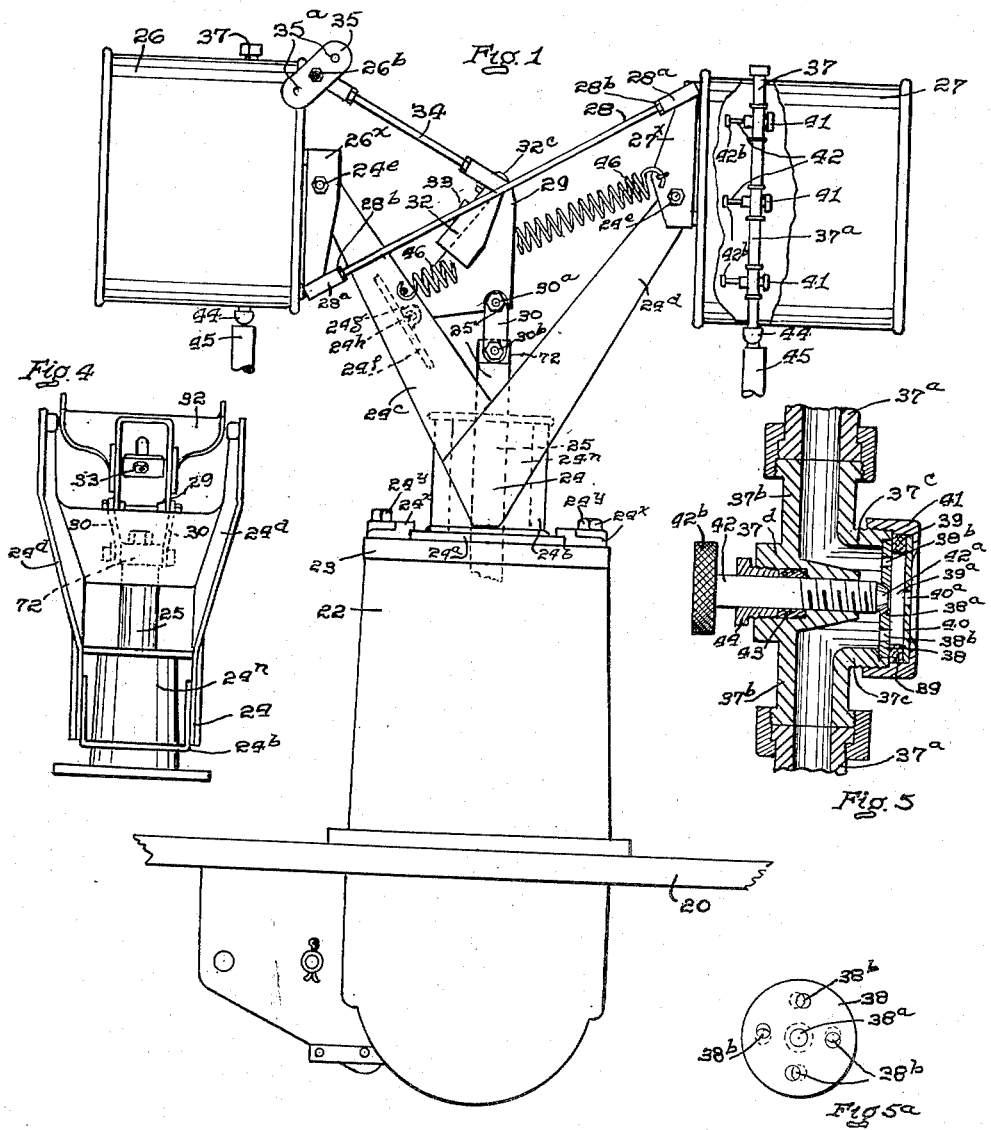
INVENTOR.
Watson W. Tranter
BY Walter W. Burns
Attorney

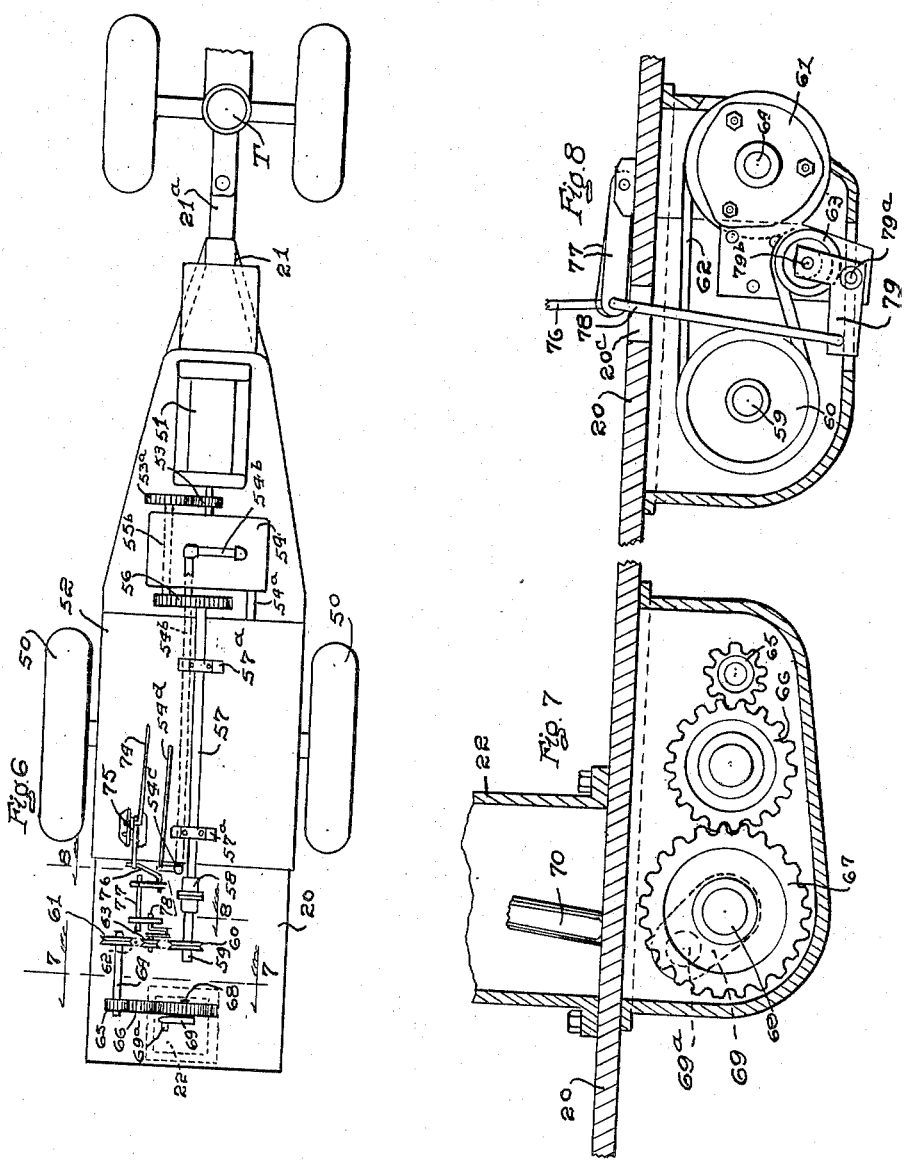

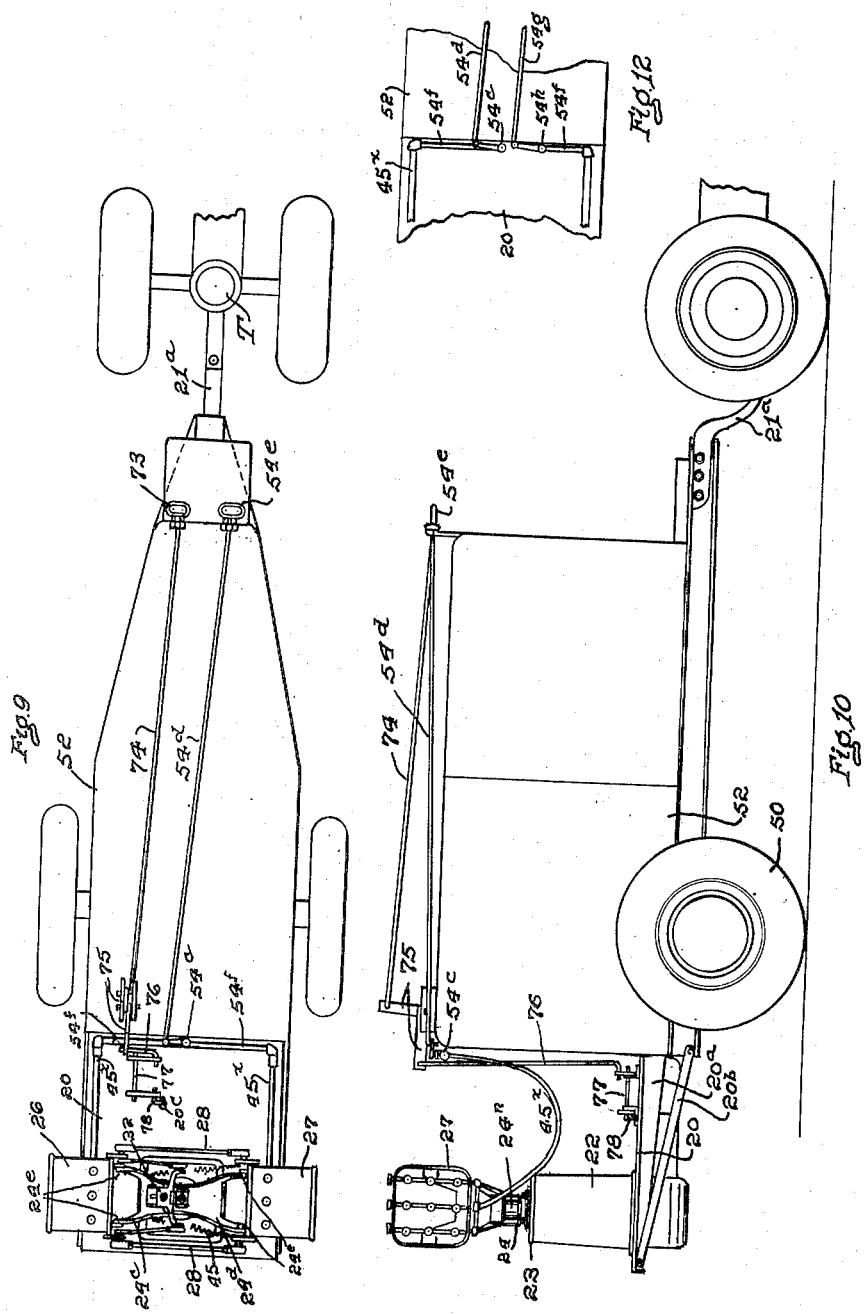

March 23, 1954
W. W. TRANTER
2,672,759
OSCILLATING MECHANISM FOR SPRAYERS
Filed Aug. 24, 1948
4 Sheets-Sheet 4
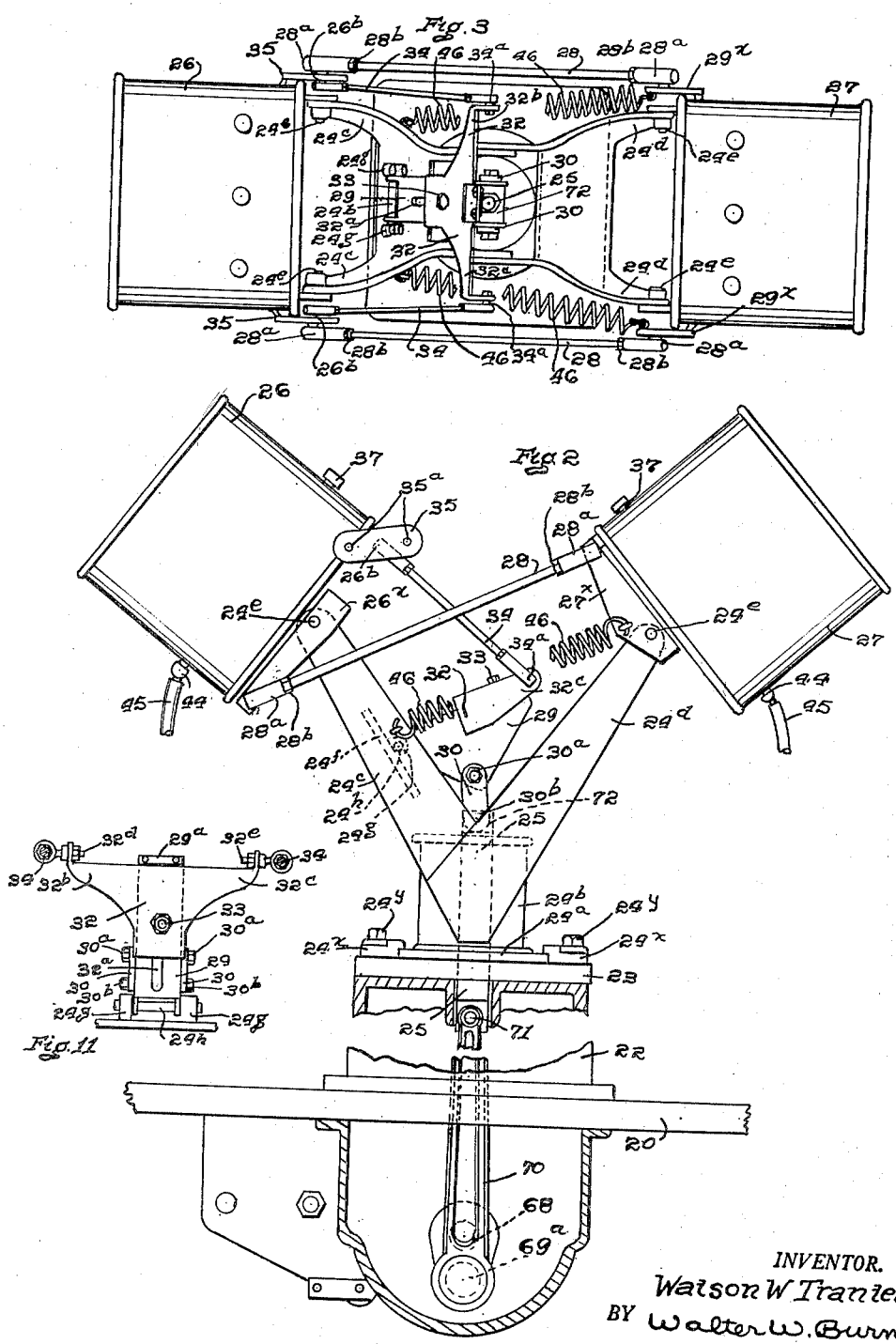
INVENTOR.
Watson W Tranter
BY Walter W. Burns
Attorney Patented Mar. 23, 1954

2,672,759

UNITED STATES PATENT OFFICE 2,672,759

OSCILLATING MECHANISM FOR SPRAYERS

Watson W. Tranter, York, Pa.

Application August 24, 1948, Serial No. 45,820

6 Claims. (Cl. 299—37)

This invention relates to sprayers and has particular relation to those sprayers wherein there is a double head for delivering a spray in two opposite directions.

In the use of power sprayers, particularly for orchards, it is sometimes necessary or desirable to obtain the maximum amount of spraying for a minimum travel over the ground. In this way, the travel of the machine is reduced to a minimum and time in delivering the spray to the trees is conserved.

The primary object of this invention is the provision of an improved spraying machine.

Another object of the invention is the provision of an improved spraying machine wherein two spray heads are provided for delivery of spray in two directions.

A further object of the invention is the provision of an improved spraying machine wherein two oscillatory spray heads are provided for delivery of spray in two general directions and are operated by a single power operated means.

A still further object of the invention is the provision of an improved spraying machine wherein two oscillatory spray heads are provided for delivery of spray in two general directions and are adjustable for height of angle of spray heads by a single adjusting means.

Another and further object of the invention is the provision of an improved spraying machine wherein two oscillatory spray heads are provided for delivery of spray in two general directions and are provided with means by which the angle of the spray throw may be, for both spray heads, adjusted by a single adjusting means.

Another and still further object of the invention is the provision of an improved spraying machine wherein there are provided two oscillatory spray heads for delivering spray in two generally opposite directions, the two spray heads being mounted on a carriage which has a vertical pivot and which may be adjusted about the vertical axis to the desired position.

Another and still further object of the invention is the provision of an improved spraying machine wherein there is provided a pivoted carriage carrying two oscillatory spray heads for delivering spray in two generally opposite directions and having the operating member for the oscillating mechanism located in the pivot of the carriage.

Another and still further object of the invention is the provision of an improved spraying machine having two oscillatory heads for delivering spray in two generally opposite directions and having readily adjustable nozzles for varying the delivery in the nozzles to equalize the effect of the wind as between the spray heads pointing in generally opposite directions.

Other and further objects of the invention will be apparent to those skilled in the art from a reading of the complete specification and claims.

Referring to the drawing wherein is illustrated an embodiment of the invention,

Fig. 1 is a side elevation of the invention showing the sprayer heads at substantially horizontal positions.

Fig. 2 is a view similar to Fig. 1 but with the sprayer heads in raised positions, the counterbalance springs being broken away for clearness.

Fig. 3 is a top plan view of the invention with the sprayer heads in horizontal positions.

Fig. 4 is a detail view showing part of the operating mechanism, with parts omitted for clearness.

Fig. 5 is a detail sectional view of one nozzle.

Fig. 5a is a detail view of the plate 38 of Fig. 5.

Fig. 6 is a diagrammatic view of the power connections from the trailer power mower.

Fig. 7 is a cross sectional view taken generally on the line 7—7 of Fig. 6.

Fig. 8 is a cross sectional view taken generally on the line 8—8 of Fig. 6.

Fig. 9 is a top plan view of the invention applied to a tank trailer, some parts being omitted for the sake of clearness.

Fig. 10 is an elevation of the structure of Fig. 9.

Fig. 11 is a detail view showing the adjusting and pivoting means of the bell crank lever.

Fig. 12 is a modified detail view of the liquid control means.

Throughout the specification and drawing, the same reference characters refer to the same or similar parts.

The numeral 20 designates the platform upon which the sprayer mechanism is mounted which platform may be a part of a sprayer trailer as illustrated.

In the embodiment illustrated, the platform is supported from the main frame 21 by the brackets 20a and the braces 20b. Mounted on the platform 20 is the fixed hollow base member 22 upon which is mounted a head plate 23. Rotatably mounted on the head plate 23 is a flanged frame 24 which is rotatable on the head plate 23. The lower portion of the rotatable frame 24 comprises the circular flange 24a from which extends upwardly the main cylindrical portion of this rotatable frame, which has been designated 24n. To secure the flange 24a in any desired adjusted position, there are two clamp members 24x which are secured by the studs 24y. Connected to the lower portion of the cylindrical member 24 is a U-shaped member 24b. At each side of the U-shaped member 24b are two upwardly and outwardly divergent arms 24c and 24d. The arms 24c, one from each side, form a pair of arms to support a sprayer head 26 and the arms 24d, one from each side, form a pair of supporting arms for the other sprayer head 27, as will later be made clear.

Within the center of the frame member 24 is a vertically reciprocating power rod 25 which is suitably mounted in bearings and is connected at its upper end to the oscillatory operating means for the sprayer heads 26, 27, and at its lower end to the gearing which gives it its power function. Both of these mechanisms will presently be described.

Pivoted as at 24e at the outer ends of the respective arms 24c and 24d are plates 26x, 27x, which are rigidly secured to the outer shells of the sprayer heads 26, 27. These pivots 24e form the supports for the sprayer heads 26, 27, and are the pivots about which the heads oscillate during the spraying operation. Connected to each side of a rigid part of one sprayer head 27, above the pivots 24e are a pair of connecting rods 28. The opposite ends of these connecting rods 28 are pivotally connected to the other sprayer head 26 at the same distance below the pivot 24e as the other end is above its pivot 24e. These rods 28 have pivot members 28a in which the rods are respectively threaded and are provided with suitable locking nuts 28b for holding the rods 28 and their pivoted members 28a in adjusted relative positions. The adjustment of these rods is usually made during the assembly operation and adjustment should not later again be necessary unless the parts get out of adjustment. Extending between the arms 24c is a web member 24f which carries lugs 24g. In suitable bearings in the lugs 24g is a pivot pin 24h. On the pivot pin 24h there is swingingly mounted a bell crank lever 29. Connected to two symmetrical points on opposite sides of the bell crank lever member 29 are links 30 which are connected respectively to the bell crank lever member 29 and the power rod 25 by the pivot pins 30a and 30b. It will be clear from this construction that when the rod 25 reciprocates vertically, the bell crank lever member 29 will swing about the pivot pin 24h. Mounted to slide on the top of the bell crank lever member 29 is a slide member 32. An adjusting bolt 33 is installed in a hole in the slide member 32 with its head below the slide 32 and so placed as to slide along in the slot 32a in the bell crank lever member 29. At the upper or outermost position of the slide 32 and on the bell crank lever member 29, there is located a stop member 29a. It will be observed that the upper portion of the slide 32 has side extending portions 32b and 32c at the extremities of which are located pivots 32d and 32e.

Pivoted on these pivots 32d and 32e are the inner ends of a pair of sprayer head-operating rods 34. The other ends of these head-operating rods 34 are pivotally connected by the pivots 26b which are suitably secured on the head 26 by the plates 35. These plates 35 which are secured to the head 26 in any suitable manner as by welding, have two or more openings 35a in which the pivots 26b can be placed to vary the throw of the head 26 when in operation.

From the above description, it will be clear that any change in the position of the outer pivot of the rod 34 where connected to the plates 35 will change the lower and upper angular limits of the positions of the head 26 when in operation and by changing position of the slide 32 on the bell crank lever member 29, the distance of the pivot 32d, 32e from the fulcrum 24h will be changed with the result that the swing of the head 26 will be increased or decreased according to the place in which the plate 32 is secured on the bell crank lever member 29. As already shown, any change in the movement of the head 26 causes a corresponding change in the movement of the head 27.

In the present embodiment, each head 26, 27 is provided with three nozzle carrying pipes 37 spaced from the parallel sides, and being substantially in a plane normal to the direction of delivery of the spray. Each pipe 37 is provided with three nozzles which will now be described.

In order to provide for the meeting of the wind conditions, it is sometimes desirable to have the air and spray blast from one sprayer head at a higher velocity than the other sprayer head. In order to bring this about there are provided means for adjusting the force of the spray which in turn causes and determines the intensity of the air blast.

The pipes 37 have sections 37a and between these are nozzle sections 37b which sections 37a and 37b may be secured together by union connections to insure that there will be no leakage of the spray liquid. The nozzle sections 37b are each provided with an annular head section 37c which has a seat to receive the valve plate 38. This plate is provided with a central conical opening 38a and a series of slanting openings 38b, which considered circumferentially, slant in the same direction. These openings 38a and 38b, receive their spray liquid from the interiors of the sections 37a and deliver the spray to a chamber 39a within the gasket 39. Outwardly of the gasket 39 is a plate 40 having a single opening 40a through which the spray liquid passes to form the spray as it clears the nozzle. A threaded flanged ring 41 which is threaded to the nozzle section 37c holds the plate 40, gasket 39 and perforated plate 38 in place.

In the conical opening 38a is a needle valve 42 which has a conical end 42a and a thumb and finger piece 42b. This needle valve is threaded in an enlarged portion 37d of the nozzle section 37b. A packing 43 which is held in place by the gland 44 prevents leakage along the stem of the needle valve 42. As the liquid passes through the openings 38a and 38b, the slanting position of the openings 38b causes a spiral action which with the conical stream from the conical orifice between the opening 38a and the conical end 42a, causes a maximum amount of liquid to be forced from the opening 40a. By varying the adjustment of the valve 42, a greater or less amount of liquid may be put forth.

In this construction, the shell of the head 26, 27 operates as a guide for the air which is mixed with the liquid as it leaves the nozzles and forms a spray. Since the nozzles of one head may be adjusted in one adjustment and the nozzles of the other head in another adjustment, the desired difference in delivery of the spray heads may be maintained as the conditions may indicate. When once set, the delivery will be the same for a given set of wind conditions. If it is desired to reverse the direction of travel, the assembly with the two heads may be reversed in position by loosening the clamp members 24x, after which the assembly is swung 180° and again secured by the studs 24y.

To the ends of the pipes 37 are secured connecting pipes 44 to which are attached hose connections 45 which are connected to the liquid tank to be described.

In order to act as a counterbalance, two springs 46 are provided. These springs 46 are connected at their upper ends to the plate 27x above the pivot 24e on which the head 27 is pivoted. The lower ends of the counterbalance springs 46 are connected to the arms 24c.

The main frame 21 of the sprayer trailer is supported by the wheels 50. The forward end of the frame 21 is provided with a hitch 21a with which it is connected to the tractor T. Mounted on the frame 21 is a tank 52 for carrying the supply liquid for the spray.

At the forward end of the main frame 21 is an internal combustion engine 51, which has a drive gear connection 53, 53a to a pump 54. A counter shaft 55b which drives the pump 54 extends through the housing of the pump 54 and is connected to an agitator drive 56. This agitator drive 56 rotates the agitator shaft 57, having agitator blades 57a, all in a well-known manner.

The rear end of the agitator shaft 57 is provided with a double universal connection 58 which is connected to a short shaft 59 on which is mounted a V-pulley 60. This V-pulley 60 is connected to a V-pulley 61 by a V-belt 62. Swingingly and pivotally mounted in a position to contact the V-belt 62 on the pulleys 31 and 32 is the idler pulley 63. The pulley 61 is mounted on a shaft 64 which has at its other end the gear 65. This gear 65 drives a pivotally mounted idler gear 66, which in turn drives the gear 67 which rotates on and with the shaft 68. The shaft 68 also carries a crank arm 69 which drives the oscillating mechanism for the sprayer heads, already described.

Connected to the wrist pin 69a is the lower end of the connecting rod 70, the upper end of which is connected by a pivot 71 to the substantially vertically movable power rod 25, already described. The power rod 25 is cylindrical and has a common axis with the vertical axis of rotation of the sprayer heads unit. As the liquid under pressure leaves the pump 54, it passes through a pipe line 54b to a cut-off valve 54c. This cut-off valve 54c is connected by an operating rod 54d, on the end of which is an operative's operating handle 54e. This latter is located near the operative's platform near the forward end of the trailer.

To the cut-off-valve 54c is connected a pipe 54d which is provided with two branches—one toward each side. To each of the branches 54f, is connected a flexible hose 45x, already described. The operative by his control of the cut-off valve 54c, by means of the handle 54e, may, at will, start and stop the delivery of the spray liquid to the sprayer heads.

On the forward end of the trailer is a handle 73 on the end of a rearwardly extending rod 74, which connects to one arm of a bell crank lever 75 at its rear end. The other end of the bell crank lever 75 is connected to a vertically extending rod 76, which at is lower end is connected to an arm of the bell crank lever 77.

The other arm of the bell crank lever 77 is connected to a vertical rod 78, which extends through an opening 20c in the platform 20 and is connected to another bell crank 79 which is pivotally supported at 79a below the platform 20. This bell crank 79 carries on one of its arms at 79b the idler pulley 63 already described. It will thus be seen that when the operative at the front of the sprayer trailer pushes or pulls on the handle 73, the idler pulley 63 will be forced into or out of engagement with the belt 62, which will act as a clutch means to transmit power from the V-pulley 60 to the V-pulley 61 to drive the crank member 69 and to thereby drive the connecting rod 70 to, in turn, drive the vertically oscillating mechanism to control the movement of the sprayer head in a vertical plane as has already been described.

As already stated, the connecting rod 70 drives the power rod 25 and reciprocates the same in a substantially vertical line. Mounted on the top of the power rod 25 and swivelled on a substantially vertical axis is the swivel block 72. This swivel block 72 and the bell crank 29 are pivotally connected by the pair of links 30.

The operation as a whole will now be described. With the sprayer trailer connected to a truck or tractor T, the motor 51 is started and the clutch (not shown) to the pump 54 is thrown in and power is supplied to the pump 54 by the pump drive gearing 53, 53a. The shaft 55b rotates to furnish power for the moving parts of the pump 54. The pump 54 draws its liquid from the tank 52 by the conduit 54a and delivers it through the pipe 54b. While the liquid is drawn from the tank 32, the agitator drive gear 56 is rotating the agitator shaft 57 so that the agitator blades 57a will stir up the solid matter in the liquid within the tank 23 in preparation for its eventual delivery to the nozzles' openings 40a.

The agitator shaft 57 drives the double universal joint 58, which in turn drives the shaft 59, the pulleys 60 and 61, the shaft 64, the gears 65, 66 and 67 and the shaft 68. The shaft 68 turns the crank 69 which through the connecting rod 70, causes the up and down reciprocating motion to the cross-head or power rod 25. The swivel block 72 at the top of the cross-head or power rod 25 moves up and down with the cross-head or power rod 25 and moves the links 30. Since the upper ends of the links 30 are connected to the bell crank lever 29 and since this lever 29 is connected to the sprayer head-operating rods 34, it follows that these rods 34, through their connections to the sprayer head 26, will operate to cause the oscillations of the sprayer head 26, and through the rods 28, the head 27 will oscillate simultaneously. By changing the adjustment of the pivots 26b in the opening 35a of the plates 35, the angular height of the axis of the sprayer head can be controlled. It is to be noted that the positioning of the pivot 26b in openings 35a nearer to the axis of the pivots 24e, will cause the axis of the sprayer head 26 to make a greater angular turn. Adjustment of the slide 32 along the bell crank lever member 29 gives a greater or less angular travel to the sprayer heads 26 and 27.

As the pressure within the nozzles forces the liquid therefrom, the air within the head shell is forced outwardly in a manner which produces a result similar to that of a Venturi tube, a great volume of the air being moved at a great speed. This action causes the finely-divided spray to be delivered in two directions and at great distances from the spray heads.

To meet different working conditions, it is found to be advantageous for the operative to be able to adjust the spray heads about a vertical axis. To do this it is only necessary for the operative to loosen the studs 24y and tighten the same after the whole assembly has been adjusted to the desired angle.

In practice, the pivot 26b would be installed in that opening 35a which would place the sprayer heads in the proper angular positions at their highest angular positions to perform the necessary function in treatment of the trees to be sprayed. In addition, the slide 32 would be adjusted to produce the desired angle of oscillation. With these adjustments completed, the tractor or truck draws the sprayer along, for example, through an orchard.

As the start or finish of an operation, the oscillation of the sprayer head may be started or stopped by the movement of the handle 73 located within reach of the operative. In like manner the delivery of the spray can be started or stopped by the handle 54e.

A separate valve for each sprayer head may be used if desired, as shown in Fig. 12 where an additional valve 54h with its rod 54g and handle 54b are shown.

While an embodiment of the invention has been illustrated and described in detail, it is to be understood that the disclosure is merely illustrative and that modifications and changes may be made without departing from the spirit of the invention and within its scope as claimed.

Having described my invention, what I claim is:

1. An oscillating mechanism for a sprayer having two opposite sprayer head supporting means, comprising a support, the support having spaced extensions for carrying the head supporting means, a vertically reciprocating member, a lever fulcrumed on the support and having one of its arms connected to the reciprocating member, the other arm of the lever having a length-varying member to alter the length of the lever arm to thereby change the throw of the lever arm and an oscillator-connection from the end of the length-varying member to the sprayer head supporting means to transmit the variable throw of the lever to the sprayer head supporting means.

2. An oscillating mechanism for a sprayer having two oppositely spaced pivoted sprayer head supporting means, comprising a support, the support having spaced extensions for carrying the head supporting means, a vertically reciprocating member at the center of the support, a lever fulcrumed on the support and having one of its arms connected to the vertically reciprocating member, the other arm of the lever having a sliding length-varying member to alter the lever arm length to thereby change the throw of the lever arm end and an oscillator-connection from the end of the variable lever-arm to the sprayer head supporting means to transmit the variable throw of the lever to the sprayer head supporting means.

3. An oscillating mechanism for a sprayer having two oppositely directed and pivoted sprayer head supporting means, comprising a support, bearing means for pivoting the support about a vertical axis, the support having spaced extensions for carrying the sprayer head supporting means, a vertically reciprocating member at the center of the support, a lever fulcrumed on the support and having its arms pivotally connected to the top of the vertically reciprocating member and to the sprayer head supporting means, the connection to the head supporting means including a variably spaced pivot carrying member on the lever for varying the position of the connection with relation to the fulcrum of the lever.

4. An oscillating mechanism for a sprayer having two opposite sprayer head supporting means, comprising a support, the support having spaced extensions for carrying the head supporting means, a vertically reciprocating member, a lever fulcrumed on the support and having one of its arms connected to the reciprocating member, the other arm of the lever being connected by a link to the head supporting means, the connection of the link to the lever comprising an adjustable means along a line making a minimum of change when the head supporting means is pointed to its lower position, thus varying the angular throw and the upper angular position without substantially changing the lower limit of movement.

5. An oscillating mechanism for a sprayer head pivoted supporting means, comprising a support, the support having spaced extensions for pivotally carrying the sprayer head supporting means, a vertically reciprocating member, a lever fulcrumed on the support and having one of its arms connected to the reciprocating member, the other arm of the lever having an arm-length varying member to alter the effective position of the second mentioned arm, a connecting member between the second arm and the pivoted sprayer head supporting means, the connection of the connecting member to the second arm being along a line to give a minimum change of position to the sprayer head supporting means, and a connection between the two sprayer head supporting means to cause simultaneous oscillating of the two sprayer head supporting means in a substantially vertical plane.

6. An oscillating mechanism for a pivoted sprayer head supporting means, comprising a support, having members for carrying the head supporting means, an operating oscillating lever fulcrumed on the support, an adjustable connection between the lever and pivoted head supporting means, said connection including an adjustable means for varying the swing and upper angular position of the head supporting means without changing substantially, the lower limit of swing and a second adjustable means for varying the lower limit of swing.

WATSON W. TRANTER.

References Cited in the file of this patent
UNITED STATES PATENTS

| Number | Name | Date |
|---|---|---|
| 436,276 | Van Depoele | Sept. 9, 1890 |
| 539,862 | Faure et al. | May 28, 1895 |
| 1,371,580 | Smith | Mar. 15, 1921 |
| 1,401,744 | Watson | Dec. 27, 1921 |
| 1,729,664 | Furguson | Oct. 1, 1929 |
| 2,237,687 | Parsons et al. | Apr. 8, 1941 |
| 2,411,964 | Grass | Dec. 3, 1946 |
| 2,480,889 | Swift | Sept. 6, 1949 |